Patented Aug. 1, 1933

1,920,407

UNITED STATES PATENT OFFICE 1,920,407

YELLOW AZO DYESTUFF

Rudolph Krech, Mannheim, Wilhelm Scheurer, Ludwigshafen - on - the - Rhine, and Adolph Koch, Hochst-on-the-Main, Germany, assignors to General Aniline Works, Inc., New York, N. Y., a Corporation of Delaware No Drawing. Application June 14, 1932, Serial No. 617,259, and in Germany February 28, 1931

8 Claims. (Cl. 260—78)

The present invention relates to new yellow azo dyestuffs which are particularly suitable for the production of colored rubber articles.

We have found that by coupling a tetrazotized benzidine, corresponding to the formula:

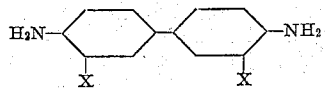

wherein X means hydrogen or methyl or the methoxy group, with an arylamide of acetoacetic acid which is devoid of solubilizing groups such as the sulpho or carboxyl groups, yellow dyestuffs are obtained which have very good fastness properties and which are therefore particularly suitable for producing colored rubber articles. Since the new dyestuffs are practically insoluble in natural rubber or in synthetic products having properties similar to those of natural rubber, they do not bleed in the production and treatment of rubber articles. Furthermore they do not give rise to the phenomenon which is known as blushing or efflorescence when the rubber articles are stored. The new dyestuffs are insoluble in benzine and are therefore highly suitable also for being used in connection with cold vulcanization processes which are usually carried out in the presence of benzine. The vulcanization products containing the aforesaid dyestuffs do not give off any of the coloring matter when treated with hot soap solution.

The coupling operation by which the new dyestuffs are produced may be effected in the known manner either in an alkaline medium or in an acetic acid soluton. Generally speaking it is advantageous to carry out the operation in a medium which is either acetic acid or which has been rendered alkaline by means of alkali metal bicarbonate, because in this case particularly pure products are obtained which do not alter their shades during the vulcanization process. As a rule, by working in a solution which has been rendered alkaline by means of sodium carbonate or caustic alkali, dyestuffs are obtained which have somewhat duller shades but which possess the same fastness properties and which do not or only very slightly alter their shade during the vulcanization operation.

It is particularly suitable to boil the finished dyestuffs in a caustic alkali solution in order to remove any excess of the acetoacetic acid amide which may be present. In order to obtain the new dyestuffs in a very voluminous form in which they can easly be distributed in the rubber products, it may be advantageous to effect either the coupling operation or the boiling in an alkaline solution or both these treatments in the presence of Turkey red oil or resin soap or other substances having dispersing properties.

The following examples will further illustrate the nature of this invention but the invention is not restricted to these examples. The parts are by weight.

Example 1

184 parts of benzidine are dissolved in 6000 parts of water and 580 parts of aqueous hydrochloric acid of 30 per cent strength and then tetrazotized with an addition of ice by means of a solution of 138 parts of sodium nitrite in 600 parts of water. The resulting solution is filtered and then run, while stirring, into an ice-cooled suspension of 440 parts of acetoacetic acid o-chloranilide which has been prepared by dissolving the said anilide in 7000 parts of water and 124 parts of caustic soda solution of 40° Baumé strength, precipitating the anilide in a finely divided form by the addition of hydrochloric acid until the mass has a neutral reaction and then adding 600 parts of sodium bicarbonate. After the coupling operation has been finished, a solution of 200 parts of resin soap in about 2000 parts of water which has been rendered alkaline to a pH value between 9 and 10, is added. The mass is boiled and the product is filtered off by suction, while hot, and washed well. The product colors rubber in greenish yellow shades.

Similar shades are obtained by employing, instead of acetoacetic acid o-chloranilide, acetoacetic acid p-chloranilide or o-anisidide; the employment of o-dianisidine instead of benzidine yields orange yellow dyestuffs.

Example 2

244 parts of 3.3'-dimethoxy-4.4'-diamino-diphenyl (o-dianisidine) are dissolved in 6000 parts of water and 580 parts of aqueous hydrochloric acid of 30 per cent strength, cooled with ice to about 0° C. and then tetrazotized, while stirring well, by adding a solution of 138 parts of sodium nitrite in 600 parts of water. 420 parts of acetoacetic acid as -m-xylidide are then dissolved in 7000 to 8000 parts of water and 120 parts of caustic soda solution of 40° Baumé strength and neutralized with hydrochloric acid whereupon 600 parts of crystalline sodium acetate are added. To this solution cooled with ice to about 10° C. the filtrated solution of the tetrazo compound is added while stirring well. Then 200 parts of caustic soda solution of 40° Baumé strength are added, the mixture is boiled and the product filtered off by suction and washed with hot water. The product colors rubber in very clear orange yellow shades.

Similar shades are obtained by employing the α- or β-naphthylamide of acetoacetic acid instead of acetoacetic acid xylidide; the employment of o-tolidine or benzidine instead of o-dianisidine yields dyestuffs having clear yellow to greenish yellow shades.

*Example 3*

212 parts of 3.3'-dimethyl-4.4'-diaminodiphenyl (o-toluidine) are tetrazotized as described in Examples 1 and 2. 400 parts of acetoactic acid o-toluidide are then dissolved in 8000 parts of water and 117 parts of caustic soda solution of 40° Baumé strength. To this solution are then added 400 parts of soda ash and 20 parts of Turkey red oil. The mass is cooled to about +10° C. while stirring well and the solution of the tetrazo compound run in through a filter. After the coupling operation has been finished the mass is heated, and the product filtered by suction while hot and washed. The product yields yellow shades in rubber.

Similar products are obtained from o-toluidine and the p-toluidide or anilide or as -m-xylidide of acetoacetic acid.

What we claim is:—

1. Azo coloring matters corresponding to the general formula:

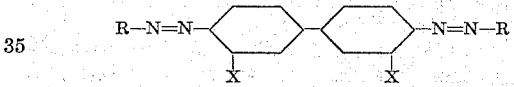

in which the X's are hydrogen or methyl groups or methoxy groups, and R is the radicle of an acetoacetic acid arylide free from carboxylic, sulphonic and azo groups.

2. Azo coloring matters which are obtainable by coupling a tetrazotized compound of the formula:

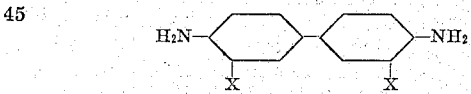

in which the X's are hydrogen or methyl groups or methoxy groups, in an acetic acid solution with an acetoacetic acid arylide free from carboxylic, sulphonic and azo groups, the shades of the said coloring matters remaining unchanged during vulcanization.

3. Azo coloring matters corresponding to the general formula:

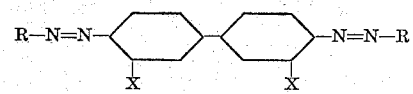

in which the X's are hydrogen or methyl groups or methoxy groups, and R is the radicle of an acetoacetic acid amide which is substituted in the amido group by a radicle of the benzene series and which is free from carboxylic, sulphonic and azo groups.

4. Azo coloring matters which are obtainable by coupling a tetrazotized compound of the formula:

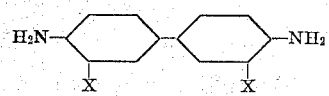

in which the X's are hydrogen or methyl groups or methoxy groups, in an acetic acid solution with an acetoacetic acid amide which is substituted in the amido group by a radicle of the benzene series and which is free from carboxylic, sulphonic and azo groups, the shades of the said coloring matters remaining unchanged during vulcanization.

5. Azo coloring matters which are obtainable by coupling tetrazotized 3.3'-dimethyl-4.4'-diaminodiphenyl with acetoacetic acid as -m-xylidide.

6. Azo coloring matters which are obtainable by coupling tetrazotized 3.3'-dimethyl-4.4'-diaminodiphenyl in an acetic acid solution with acetoacetic acid as -m-xylidide, the shades of the said coloring matters remaining unchanged during vulcanization.

7. Azo coloring matters which are obtainable by coupling tetrazotized 3.3'-dimethoxy-4.4'-diaminodiphenyl with acetoacetic acid as -m-xylidide.

8. Azo coloring matters which are obtainable by coupling tetrazotized 3.3'-dimethoxy-4.4'-diaminodiphenyl in an acetic acid solution with acetoacetic acid as -m-xylidide, the shades of the said coloring matters remaining unchanged during vulcanization.

RUDOLPH KRECH.
WILHELM SCHEURER.
ADOLPH KOCH.

CERTIFICATE OF CORRECTION.

Patent No. 1,920,407. August 1, 1933.

RUDOLPH KRECH, ET AL.

It is hereby certified that error appears in the printed specification of the above numbered patent requiring correction as follows: Page 2, lines 14 and 27, for "o-toluidine" read "o-tolidine"; and that the said Letters Patent should be read with these corrections therein that the same may conform to the record of the case in the Patent Office.

Signed and sealed this 24th day of October, A. D. 1933.

F. M. Hopkins (Seal) Acting Commissioner of Patents.